United States Patent
Elder

(10) Patent No.: US 11,186,383 B2
(45) Date of Patent: Nov. 30, 2021

(54) CENTRIFUGAL FUEL PUMP ICE PREVENTION

(71) Applicant: Hamilton Sundstrand Corporation, Charlotte, NC (US)

(72) Inventor: James S. Elder, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 185 days.

(21) Appl. No.: 16/373,276

(22) Filed: Apr. 2, 2019

(65) Prior Publication Data

US 2020/0317364 A1 Oct. 8, 2020

(51) Int. Cl.
*F02C 7/224* (2006.01)
*B64D 37/34* (2006.01)
*F02M 37/04* (2006.01)

(52) U.S. Cl.
CPC .............. *B64D 37/34* (2013.01); *F02C 7/224* (2013.01); *F02M 37/04* (2013.01)

(58) Field of Classification Search
CPC ...... F04D 28/2261; F04D 28/28; F02C 7/047; F02C 7/224; B64D 37/34
See application file for complete search history.

(56) References Cited

U.S. PATENT DOCUMENTS

| | | | | | |
|---|---|---|---|---|---|
| 2,534,662 | A | * | 12/1950 | Froom | B64C 11/14 416/245 R |
| 2,704,516 | A | * | 3/1955 | Mock | F02M 37/18 415/56.5 |
| 3,627,239 | A | | 12/1971 | Hull, Jr. | |
| 4,201,544 | A | * | 5/1980 | Briggs | F24H 3/0488 432/222 |
| 4,474,530 | A | * | 10/1984 | Coffinberry | F02C 7/224 415/164 |
| 4,749,332 | A | * | 6/1988 | Coffinberry | F02C 7/224 415/143 |
| 6,401,446 | B1 | * | 6/2002 | Gibbons | F02C 9/38 60/39.281 |
| 6,434,473 | B1 | | 8/2002 | Hattori | |
| 7,845,177 | B2 | | 12/2010 | Parsons | |
| 7,878,003 | B1 | | 2/2011 | Smith | |
| 2005/0066648 | A1 | | 3/2005 | Dalton | |
| 2013/0068704 | A1 | * | 3/2013 | Hagshenas | F01D 25/32 210/787 |

(Continued)

FOREIGN PATENT DOCUMENTS

CN 203584578 U 5/2014

OTHER PUBLICATIONS

Extended European Search Report dated Jun. 23, 2020, issued during the prosecution of European Patent Application No. EP 19211929.5.

*Primary Examiner* — Craig Kim
(74) *Attorney, Agent, or Firm* — Locke Lord LLP; Georgi Korobanov; Gabrielle L. Gelozin

(57) ABSTRACT

A fuel pump arrangement including a housing and an impeller located within the housing configured for receiving cold fuel through an inlet of the housing, wherein the impeller includes a series of vanes for drawing fluid and a nose cone defining an axis, wherein the nose cone includes a channel therethrough for passing warm fuel to an exterior surface of the nose cone for mixing with the cold fuel.

12 Claims, 2 Drawing Sheets

(56) References Cited

U.S. PATENT DOCUMENTS

2016/0298547 A1  10/2016  Ripley et al.
2017/0037863 A1* 2/2017  Kovach ............... F04D 29/2277
2018/0355887 A1* 12/2018 Wood ...................... F02C 7/224

* cited by examiner

CENTRIFUGAL FUEL PUMP ICE PREVENTION

BACKGROUND

Technological Field

The present disclosure relates to a boost fuel pump, and more particularly to an ice preventing boost pump.

Description of Related Art

A variety of devices are known in the aircraft field for pumping fuel. Engine centrifugal boost fuel pumps are susceptible to blockage due to ice crystals suspended in the fuel. Ice crystals can accumulate on the boost pump to the point where a significant flow restriction is formed impeding the operation of the pump. Inlet geometry changes have been shown to prevent some ice accumulation but are very dependent on eliminating any low flow velocities or stagnation areas.

The conventional methods and systems have generally been considered satisfactory for their intended purpose. However, there is still a need in the art for a boost pump having improved ant-ice capabilities. There also remains a need in the art for such anti-ice capabilities and components that are economically viable. The present disclosure may provide a solution for at least one of these remaining challenges.

SUMMARY OF THE INVENTION

A fuel pump arrangement includes a housing and an impeller located within the housing configured for receiving cold fuel through an inlet of the housing, wherein the impeller includes a series of vanes for drawing fluid and a nose cone defining an axis. The nose cone can be located within the housing. The nose cone includes a channel therethrough for passing warm fuel to an exterior surface of the nose cone for mixing with the cold fuel. The nose cone can be located ahead of the series of vanes. The nose cone can extend partially beyond the vanes of the impeller. The nose cone can extend ahead of the series of vanes. The channel can extend through the nose cone past the series of vanes.

The channel includes an outlet, the outlet of the channel can be directed in a downstream direction. The channel can include multiple outlets, the outlet can also be located on a tip of the nose cone.

The impeller can be threadably connected to a drive shaft or through a spline connection. The channel of the nose cone can be fluidly connected to a bearing for receiving a return fuel.

The fuel pump arrangement can include a fuel line for transporting fuel from the impeller downstream to a heat exchanger and a return fuel line for transporting fuel upstream from the heat exchanger to the channel for mixing with the cold fuel at the inlet. The pressure of the return fuel line can be greater than pressure of the inlet fuel line. The fuel pump arrangement can include a controller for controlling fuel flow into the channel.

A method of conditioning fuel also contemplated herein includes pumping inlet fuel at a first temperature from an engine fuel inlet to a downstream heat exchanger by a boost pump including an impeller and mixing the inlet fuel with return fuel from the heat exchanger having a temperature higher than the first temperature at a location upstream of the impeller and controlling flow of the return fuel based on the inlet fuel temperature. The resulting temperature of the mixed fuel is above 32 F and can form a boundary layer on a surface of the impeller.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
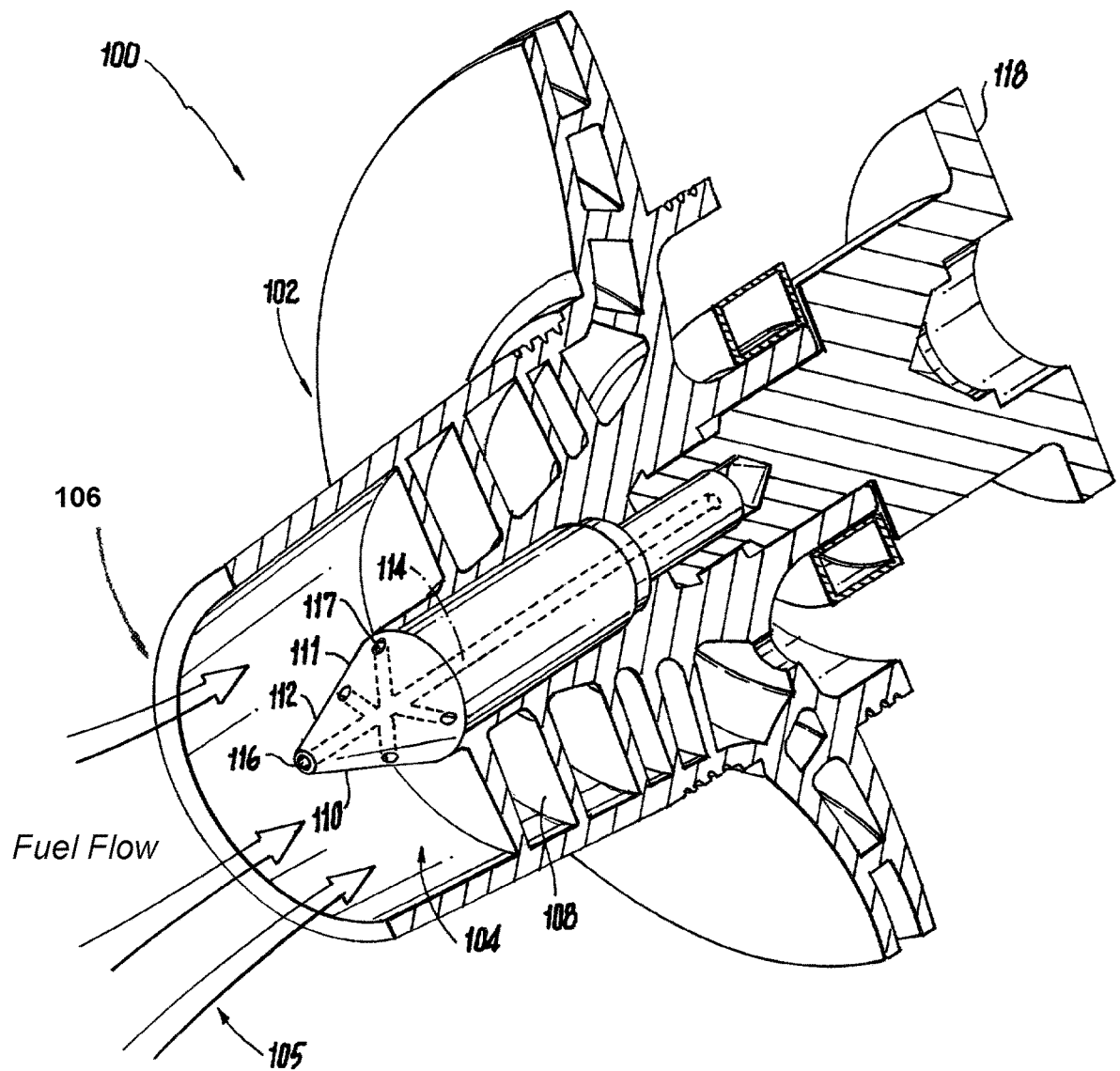
FIG. 1 is a perspective view of a fuel boost pump.

Reference will now be made to the drawings wherein like reference numerals identify similar structural features or aspects of the subject invention. For purposes of explanation and illustration, and not limitation, a partial view of an exemplary embodiment of a fuel boost pump in accordance with the invention is shown in FIG. 1 and is designated generally by reference character 100. Other embodiments of the fuel boost pump in accordance with the invention, or aspects thereof, are provided in FIG. 2, as will be described. The methods and systems of the invention can be used to mitigate ice formation in a boost pump.

Referring to FIG. 1, a fuel pump 100 arrangement includes a housing 102 and an impeller 104 located within the housing configured for receiving cold fuel 105 through an inlet 106 of the housing, wherein the impeller 104 includes a series of vanes 108 for drawing fluid and a nose cone 110 defining an axis. The nose cone 110 located within the housing. The conical portion 112 of the nose cone 110 is located upstream of the series of vanes 108. The nose cone 110 extends partially beyond the vanes 108 of the impeller. The nose cone 110 includes a channel 114 therethrough for passing warm fuel to an exterior surface 111 of the nose cone 110 for mixing with the cold fuel 105. The channel 114 can extend through the nose cone 110 past the series of vanes 108. The mixture of the fuel results in a temperature entering the impeller 108 above ice forming temperature.

The channel 114 includes an outlet 116, the outlet 116 of the channel can be directed in a downstream direction 117. The channel 114 can include multiple outlets, one of the outlets 116 can also be located on a tip of the nose cone. The impeller 104 is threadably connected to a drive shaft 118.

Figure 2:
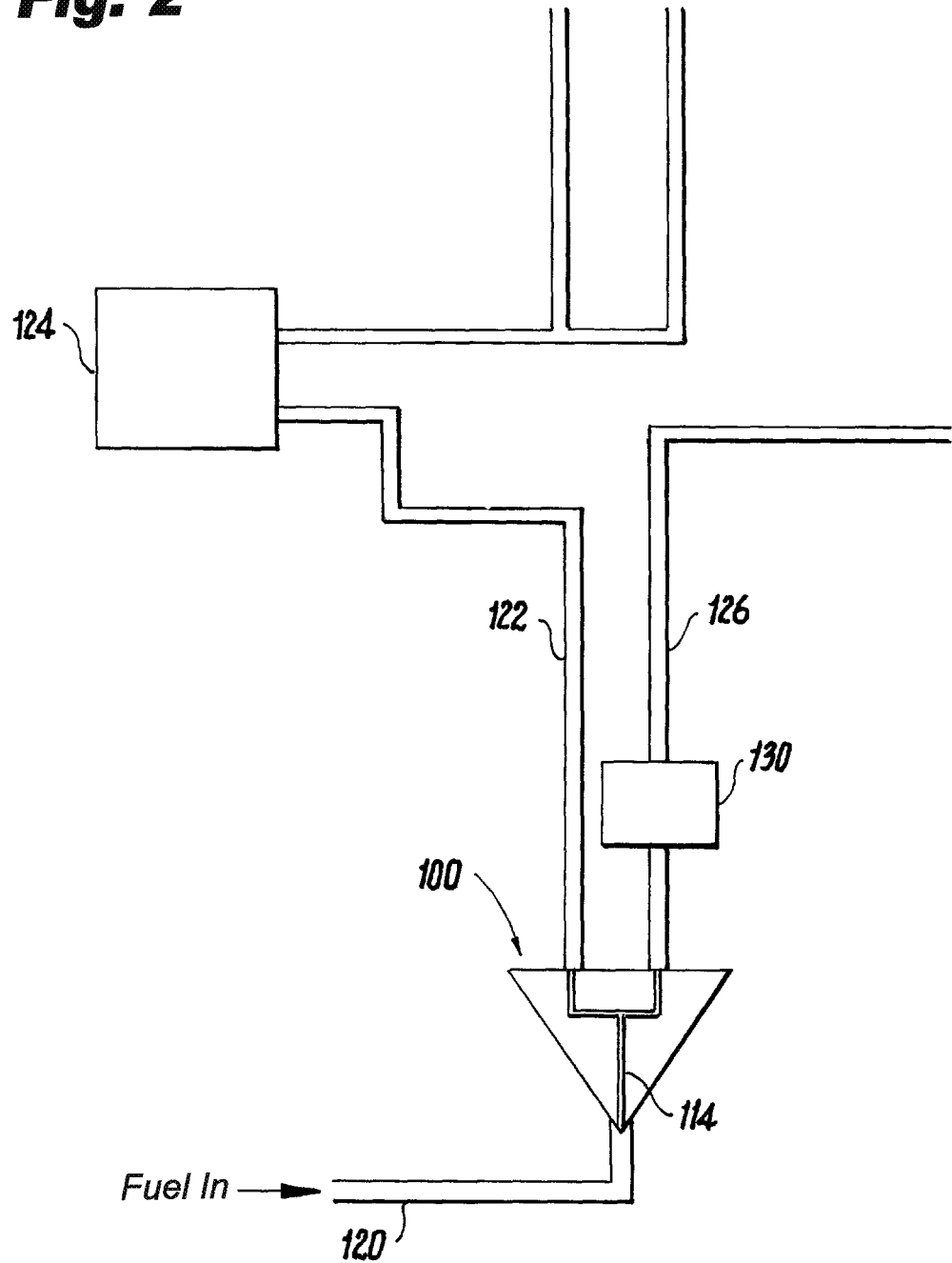
FIG. 2 is a schematic block view of a fuel system including the fuel boost pump of FIG. 1.

As shown in FIG. 2, the channel of the nose cone 114 is fluidly connected to a higher-pressure warm fuel supply. This warm fuel supply is located downstream of a heat exchanger 124. This warm fuel supply is drawn immediately downstream of the heat exchanger but upstream of the main pump, or downstream of the heat exchanger downstream of the pump. Some aircraft fuel systems that include fueldraulic actuators return warm fuel flow and are also contemplated to be used as a source. The warm fuel flow rate will need to be controlled to minimize the effect on pump performance.

As shown further in FIG. 2, the fuel pump arrangement includes a fuel line 120 for transporting fuel to a boost pump 100 from an fuel reservoir and a fuel line 122 from the boost pump 100 to a downstream heat exchanger 124 and a fuel line 126 for transporting fuel to the boost pump. The pressure of the return fuel line 126 is greater than pressure of the inlet fuel line 120 allowing the return fuel to be returned. The fuel pump arrangement can include a controller 130 for controlling return fuel flow into the channel.

A method of conditioning fuel also described herein includes pumping inlet fuel at a first temperature from an engine fuel inlet to a downstream heat exchanger by a boost pump including an impeller and mixing the inlet fuel with return fuel from the heat exchanger having a temperature higher than the first temperature at a location upstream of the impeller and controlling flow of the return fuel based on the inlet fuel temperature. The resulting temperature of the mixed fuel is above 32 F and can form a boundary layer on a surface of the impeller. The ability to design and operate the boost pump under any steady state or transient ice condition by porting more or less warm fuel to the boost inlet is a major benefit. This method is not dependent upon geometry maintaining a minimum flow velocity which does not work for high ice concentrations.

The methods and systems of the present disclosure, as described above and shown in the drawings, provide for fuel systems with superior properties including increased reliability and stability, and reduced size, weight, complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A fuel pump arrangement comprising:
   a housing defining an inlet; and
   an impeller located within the housing configured to draw fuel through the inlet, wherein the impeller includes a series of vanes for drawing fluid and a nose cone defining an axis; and
   a nose cone disposed at the impeller having a channel configured to port warm fuel therethrough to a portion the nose cone within the inlet;
   a fuel line for transporting fuel from the impeller downstream to a heat exchanger; and
   a return fuel line for transporting fuel downstream of the heat exchanger to the channel for mixing with the cold fuel, wherein the pressure of the return fuel line is greater than pressure of the inlet fuel line.

2. The fuel pump arrangement of claim 1, wherein the nose cone is located within the housing.

3. The fuel pump arrangement of claim 1, wherein the nose cone extends partially beyond the vanes of the impeller.

4. The fuel pump arrangement of claim 1, wherein the nose cone extends ahead of the series of vanes.

5. The fuel pump arrangement of claim 1, wherein the channel extends axially through the nose cone past the series of vanes.

6. The fuel pump arrangement of claim 1, wherein the channel of the nose cone includes an outlet at the tip of the nose cone.

7. The fuel pump arrangement of claim 1, wherein an outlet of the channel is directed in a downstream direction.

8. The fuel pump arrangement of claim 1, wherein the channel includes multiple outlets.

9. The fuel pump arrangement of claim 1, wherein the impeller is threadably connected to a drive shaft.

10. The fuel pump arrangement of claim 1, wherein the channel of the nose cone is fluidly connected to a warm fuel supply of higher pressure.

11. The fuel pump arrangement of claim 1, further comprising a controller for controlling fuel flow into the channel.

12. The fuel pump arrangement of claim 1, wherein the channel of the nose cone includes a plurality outlet at the tip of the nose cone.

* * * * *